United States Patent
Quinlan et al.

(10) Patent No.: US 8,856,025 B2
(45) Date of Patent: *Oct. 7, 2014

(54) METHOD AND SYSTEM FOR REDEEMING PRODUCT MARKETING REBATES

(71) Applicants: The Ohana Companies, Inc., Wilmington, DE (US); PlusNetMarketing, Inc., Exton, PA (US)

(72) Inventors: Chris Quinlan, Greenville, DE (US); Edward A. Devlin, Downington, PA (US)

(73) Assignees: The Ohana Companies, Inc., Wilmington, DE (US); PlusNetMarketing, Inc., Exton, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/053,398

(22) Filed: Oct. 14, 2013

(65) Prior Publication Data

US 2014/0108116 A1    Apr. 17, 2014

Related U.S. Application Data

(63) Continuation of application No. 10/661,886, filed on Sep. 15, 2003, now Pat. No. 8,560,382, which is a (Continued)

(51) Int. Cl.
*G06Q 30/00* (2012.01)
*G06Q 30/02* (2012.01)

(52) U.S. Cl.
CPC .......... *G06Q 30/0234* (2013.01); *G06Q 30/02* (2013.01); *G06Q 30/0222* (2013.01)
USPC ........................................................ 705/14.1

(58) Field of Classification Search
CPC ... G06Q 90/00; G06Q 30/0234; G06Q 30/02; G06Q 30/0222; G06Q 20/20; G06Q 20/201; G06Q 20/209; G06Q 20/387; G06Q 20/401; G06Q 30/0212; G06Q 30/0215; G06Q 30/0224; G06Q 30/0225; G06Q 30/0235; C09D 163/00

USPC ......................................................... 705/14, 1
See application file for complete search history.

(56) References Cited

U.S. PATENT DOCUMENTS 4,750,119 A    6/1988    Cohen et al.
4,882,675 A    11/1989    Nichtberger et al.
(Continued)

FOREIGN PATENT DOCUMENTS

CA        2240432      7/1997
WO    WO 94/04979    3/1994
(Continued)

OTHER PUBLICATIONS

U.S. Appl. No. 60/149,156, Steven B. Solomon.
(Continued)

*Primary Examiner* — Daniel Lastra
(74) *Attorney, Agent, or Firm* — RatnerPrestia

(57) ABSTRACT

A system and computerized method of processing a rebate claim from a purchaser comprising means for or steps of receiving and storing: (a) personal information about the purchaser, including an account identifier associated with a designated account, (b) promotion information comprising one or more promotional offers associated with one or more promoted products, (c) purchase information corresponding to the at least one purchase transaction in which the designated account was used as an instrument of payment. Purchase information is associated with the purchaser using the designated account identifier, the rebate claim is validated, and the collective value associated with the rebate claim is provided to the purchaser. One embodiment may comprise means for or a step of receiving an instruction from the purchaser via an online user interface prior to the end of a qualifying period authorizing completion of rebate claim processing.

39 Claims, 5 Drawing Sheets

Related U.S. Application Data continuation of application No. 09/495,819, filed on Feb. 2, 2000, now Pat. No. 6,748,365.

(60) Provisional application No. 60/154,087, filed on Sep. 15, 1999.

(56) References Cited

U.S. PATENT DOCUMENTS

| | | | |
|---|---|---|---|
| 4,896,791 A | 1/1990 | Smith | |
| 4,941,090 A | 7/1990 | McCarthy | |
| 5,056,019 A | 10/1991 | Schultz et al. | |
| 5,176,224 A | 1/1993 | Spector | |
| 5,200,889 A | 4/1993 | Mori | |
| 5,287,268 A | 2/1994 | McCarthy | |
| 5,305,197 A | 4/1994 | Axler et al. | |
| 5,380,991 A | 1/1995 | Valencia et al. | |
| RE34,915 E | 4/1995 | Nichtberger et al. | |
| 5,403,236 A | 4/1995 | Greig | |
| 5,467,269 A | 11/1995 | Flaten | |
| 5,502,636 A | 3/1996 | Clarke | |
| 5,537,314 A | 7/1996 | Kanter | |
| 5,667,247 A | 9/1997 | Ramsburg et al. | |
| 5,710,886 A | 1/1998 | Christensen et al. | |
| 5,729,693 A | 3/1998 | Holda-Fleck | |
| 5,760,381 A | 6/1998 | Stich et al. | |
| 5,774,870 A | 6/1998 | Storey | |
| 5,791,991 A | 8/1998 | Small | |
| 5,806,043 A | 9/1998 | Toader | |
| 5,892,827 A | 4/1999 | Beach et al. | |
| 5,905,246 A | 5/1999 | Fajkowski | |
| 5,907,830 A | 5/1999 | Engel et al. | |
| 5,918,909 A | 7/1999 | Fiala et al. | |
| 5,924,078 A | 7/1999 | Naftzger | |
| 5,924,080 A | 7/1999 | Johnson | |
| 5,945,653 A | 8/1999 | Walker et al. | |
| 5,958,174 A | 9/1999 | Ramsberg et al. | |
| 5,970,469 A | 10/1999 | Scroggie et al. | |
| 5,983,196 A | 11/1999 | Wendkos | |
| 6,009,411 A | 12/1999 | Kepecs | |
| 6,039,244 A | 3/2000 | Finsterwald | |
| 6,068,183 A | 5/2000 | Freeman et al. | |
| 6,105,865 A | 8/2000 | Hardesty | |
| 6,173,267 B1 | 1/2001 | Cairns | |
| 6,267,670 B1 | 7/2001 | Walker et al. | |
| 6,278,980 B1 | 8/2001 | Wendkos | |
| 6,298,330 B1 | 10/2001 | Gardenswartz | |
| 6,330,543 B1 | 12/2001 | Kepecs | |
| 6,450,407 B1 | 9/2002 | Freeman et al. | |
| 6,571,279 B1 | 5/2003 | Herz et al. | |
| 6,598,024 B1 | 7/2003 | Walker et al. | |
| 6,745,936 B1 | 6/2004 | Movalli et al. | |
| 6,748,365 B1 | 6/2004 | Quinlan et al. | |
| 6,847,935 B1 | 1/2005 | Solomon et al. | |
| 6,865,544 B1 | 3/2005 | Austin | |
| 6,915,271 B1 | 7/2005 | Meyer et al. | |
| 7,090,138 B2 | 8/2006 | Rettenmyer et al. | |
| 7,120,591 B1 | 10/2006 | Solomon et al. | |
| 7,428,988 B1 | 9/2008 | Starr | |
| 7,587,334 B2 | 9/2009 | Walker et al. | |
| 7,933,841 B2 | 4/2011 | Schmeyer et al. | |
| 8,346,600 B2 | 1/2013 | Quinlan et al. | |
| 8,560,382 B2 * | 10/2013 | Quinlan et al. | 705/14.1 |
| 2001/0018664 A1 | 8/2001 | Jacoves et al. | |
| 2002/0019784 A1 | 2/2002 | Ritz | |
| 2002/0116264 A1 | 8/2002 | Feidelson et al. | |
| 2003/0229539 A1 | 12/2003 | Algiene | |
| 2005/0075932 A1 | 4/2005 | Mankoff | |
| 2007/0016472 A1 | 1/2007 | Reznik | |
| 2010/0198673 A1 | 8/2010 | Quinlan et al. | |
| 2011/0231237 A1 | 9/2011 | Christensen | |

FOREIGN PATENT DOCUMENTS

| | | |
|---|---|---|
| WO | WO 95/30199 | 11/1995 |
| WO | WO 99/11066 | 3/1999 |
| WO | WO 99/30256 | 6/1999 |
| WO | WO 01/20445 | 3/2001 |
| WO | WO 2009/042251 | 4/2009 |

OTHER PUBLICATIONS

Nguyen, Thuy N., Non-Final Office Action dated Jun. 20, 2013 for U.S. Appl. No. 10/768,639.

Office Action dated Jun. 29, 2004, for Canadian Application No. 2,383,067, 5 pgs.

Office Action dated Jan. 19, 2006, for Canadian Application No. 2,383,067, 6 pgs.

Office Action dated Jan. 4, 2007, for Canadian Application No. 2,383,067, 9 pgs.

Office Action dated May 8, 2008, for Canadian Application No. 2,383,067, 6 pgs.

Office Action dated Jul. 30, 2010, for Canadian Application No. 2,383,067, 11 pgs.

Official Action of Sep. 14, 2010, for Norwegian Patent Application No. 2002 1240, 2 pgs. (English translation is attached, 3 pgs.).

ShopKo Super Combo Rebates Submission Form, Aug. 30 through Sep. 5, 1998, p. 14.

AAFES BX/PX Cash Back Submission Form, Apr. 27 through May 31, 1997, 1 page.

Phar-Mor United Rebates Submission Form, Jun. 26 and Jul. 29, 1997, 1 page.

Eckerd All-In-One, Aug. 1 through Sep. 4, 1999, pp. 12 and 13.

Kmart Bonus Savings Submission Form, Jan. 1 through Jan. 30, 1999, 1 page.

Sam's Club Rebates Submission Form, Aug. 27 through Oct. 1, 1999, pp. 18 and 19.

Ed Margulies, *236 Killer Voice Processing Applications Covering Voice Processing, Audiotex, Call Center, Outbound Dialing, Interactive Fax, IVR, and Messaging*, Flatiron Publishing, Inc., Jul. 1995, Chapter 7, pp. 50-53.

Walgreens Receipt Savers Rebate Club, Mar. 28 through Apr. 24, 1999, 2 pages.

Wegman's Shopper Club Rewards, Member Mailing, Jan. 1, 1998 through Nov. 30, 1998, 2 pages.

Wegman's Internet Web Page, Nov. 24, 1998, 2 pages.

Wegman's Internet Web Pages, Aug. 30, 1999, 7 pages.

How2.com Internet Web Pages Feb. 1, 2000, 10 pages.

*The One to One Future*, Don Peppers and Martha Rogers, Ph.D.; published 1993, 1996; pp. 95-122, 152.

U.S. Office Action for U.S. Appl. No. 12/219,812, Feb. 4, 2014, 20 pages.

* cited by examiner

METHOD AND SYSTEM FOR REDEEMING PRODUCT MARKETING REBATES

CLAIM OF PRIORITY

This application is a Continuation of U.S. patent application Ser. No. 10/661,886, filed Sep. 15, 2003 (now U.S. Pat. No. 8,560,382), which is a Continuation of U.S. patent application Ser. No. 09/495,819, filed Feb. 2, 2000 (now U.S. Pat. No. 6,748 365), which claims priority based upon U.S. Provisional Application Ser. No. 60/154,087, filed on Sep. 15, 1999, each of the aforementioned incorporated herein by reference in its entirety.

TECHNICAL FIELD

This invention relates to the redemption of product marketing rebates, and more specifically to a business method for electronically redeeming product marketing rebates.

BACKGROUND OF THE INVENTION

Product marketing rebates are well-known to most consumers and are an established weapon in the marketer's arsenal of methods to entice a consumer to buy a product. Traditionally, manufacturers have individually offered rebates of a predetermined cash value to consumers who buy a designated product and mail in a rebate claim that meets certain criteria. Typically, this criteria includes filling out a specific rebate form with the name and address of the consumer, enclosing a cash register receipt showing where and when the item was purchased, and sometimes enclosing the Universal Product Code (UPC) or other designated portion of the product packaging to show that the product was actually consumed. After 6-12 weeks, the consumer then receives a check in the mail from the manufacturer or from a "fulfillment house" contracted by the manufacturer to administer the rebate program.

The process of redeeming a rebate is one that can be time consuming for the consumer, requiring the consumer to keep track of register receipts and UPCs for each product, fill out forms, mail each form to a different manufacturer or fulfillment house, and cash each check that returns from the manufacturer or fulfillment house. Thus, because of the aggravation and work required to take advantage of rebates, many consumers choose not to participate in such rebate offers at all. The purchasing decisions of such reluctant consumers are therefore not influenced by rebates, much to the chagrin of product marketers.

Recently, however, certain retailers have offered to consumers the opportunity to bundle all their rebate claims in a single, easy-to-use form that can be sent to the retailer (or the retailer's fulfillment house designee) to obtain rebates for all qualified items purchased at that retailer. The rules of such consolidated rebate programs typically limit the customer to only one submission within a certain time period. Each submission generally requires the consumer to send in the retailer's pre-printed form, which identifies all the rebate offers by a specific number, along with the original cash register receipt. The consumer must typically manually fill out the pre-printed form as directed, circle the rebated items on the cash register receipt, and write each identifying rebate offer number next to each encircled item on the receipt. Then, after what is still a 6-12 week period, the customer typically receives a check in the mail from the retailer for the total amount of rebate offers fulfilled.

The consolidated rebate fulfillment method comprises a number of steps, many of which do not include the consumer. Referring now to the flowchart depicted in FIG. 1, the traditional consolidated rebate business method is outlined. First, in step 10, the consumer makes a purchase at the point of sale (POS). Next, in step 20, the consumer checks the appropriate boxes on the pre-printed form, writes in the consumer's name and address, circles the appropriate entries on the cash register receipt, hand writes the rebate offer numbers next to those entries, and mails in the form and attached receipts to the designated address. In step 30, a fulfillment house, typically a contractor hired by the retailer to administer the rebate program, processes the paperwork received from the consumer. Finally, in step 40, the consumer receives the check.

Step 30 includes many sub-steps. In step 32, a mailroom worker at the fulfillment house must first physically open the mail. Sometimes, in order for the fulfillment house to ensure it has enough workers to meet the turnaround deadlines guaranteed to the retailer, the fulfillment house must somehow quantify the mail to be sure that it can be processed in time. Thus, the mail opening step may also include a mail quantifying step, such as a bulk weighing step where the total weight of the incoming offers is determined to estimate how many offers have been received.

Next, in step 34, an order processing worker verifies that the products encircled on the receipt match the rebate offer numbers indicated on the pre-printed form, verifies the date of the receipt is within the qualifying time period, and verifies other details (number of items purchased, etc.) to be certain that the consumer has met the initial criteria for claiming the rebate. The order processing worker may also record codes indicating the number of items requested for refund and record data for variable rebate offers. For example, if the refund amount is dependent on the number of items purchased, a code may be recorded indicating how many of the items were purchased. If the rebate amount is based on purchase price with designated minimum and maximum purchase prices, the order processing worker may write down the amount to be refunded, either the actual purchase price if within the proper range, or the minimum or maximum as specified. If the consumer does not qualify for a particular rebate for which a claim was submitted, the order processor may record a particular "unqualified" code indicating that the claim is unqualified and, optionally, a standard category of reasons why the claim is unqualified.

A data entry worker then physically enters the data contained on the form into a computer database in step 36. This data may include accounting information such as the promotion number, the voucher number, the operator number, and mail count indicators; consumer personal information such as the name, address, state, and zip code; refund information, such as the total number of items and amount requested for refund and the list of refund items; and supplemental information such as the store number and unqualified codes, if present.

Thus, after data entry, the computer database now holds such data as the name and address of the consumer, the offer numbers for which the consumer qualifies, and information relating to the number and types of items purchased. An audit step may also be performed after the order processing step 34 and/or the data entry step 36 as quality control to assure that the number of errors have been minimized. Unqualified claims, in particular, may be reviewed to assure that the claim is indeed unqualified. At step 38, the data entered into the computer is processed through a fraud detection step. Often, the fraud detection step encompasses processing the information using computer software that can verify, among other things, that the person named to receive the rebate actually lives at the address given, that only one offer per household address is being granted, and that the person named to receive the rebate is not on a list of known fraudulent rebate claim submitters. Frequently, at least one or more components of the fraud detection step may involve using a third party computer database, such as databases maintained by the postal inspection branch of the U.S. Postal Service, which may be shared or utilized by many different fulfillment houses. The process from mail opening to inputting, verifying, and checking the data may itself take several weeks, depending on the volume of mail being processed and the number of workers processing the rebate claims. The mail may also be retained in storage for a designated amount of time and destroyed per a set mail retention guideline, thus requiring storage space and destruction capabilities.

The information provided by the consumers who claim rebates can be used by the retailer, if desired. For instance, the database of consumers claiming rebates indicates the names and address of that retailer's customers who buy the type of items for which rebates were requested. Thus, the retailer can optionally use the database of names and addresses compiled by the fulfillment house to target directed advertising to these consumers. The retailer can conduct this directed advertising itself and/or can sell the names and preferences of these consumers to other marketers, advertisers, and manufacturers who may wish to target those consumers. The database of consumers and their buying habits is also available to the fulfillment house, who may also use the information, provided their agreement with the retailers or manufacturers allows them to do so.

The gathering, selling, and processing of marketing information about consumers is a very profitable industry that is only partially tapped by such rebate programs. Because typically only the rebate-specific information is entered into the customer database from the cash register receipts supplied by the consumers, the information gathered during such the rebate fulfillment process is necessarily limited. To gather information about every purchase that a consumer makes, many retailers have begun using "loyalty cards". Loyalty cards are typically a credit-card-sized card that the consumer or cash register attendant swipes or scans into the POS cash register system prior to or during the checkout process. The loyalty card typically contains a magnetic or UPC marking that identifies the individual associated with that card, generally by a serial number contained on the card that matches to a specific customer record in a separate customer database. As a condition for receiving a card from the retailer, the consumer usually must provide their name and address, as well as other demographic information (age group, household income, family size, etc.), so that a record of personal information can be stored in a database and matched to the card serial number. To entice the user to supply the loyalty card at the POS each time the consumer purchases goods at the retailer, the retailer usually offers special discounts or offers only to card users. Through the use of a loyalty card, therefore, retailers can keep a frequently updated data record of every purchase made by a particular consumer over time.

By analyzing the data collected through the loyalty card system, not only can the retailer identify individual consumers to be targeted for special offers, but the retailer can also analyze general demographic trends among large groups of purchasers to provide feedback on how pricing or other incentives affect consumer purchasing decisions. A drawback of loyalty cards is that not every consumer is willing to participate, nor do the consumers always remember their card. In fact, many consumers know that even if they have forgotten their card, they may request a temporary card at the service desk for the purposes of receiving the special offers that day, thus bypassing the retailer's system of tying purchases to individual consumers.

Certain retailers have begun to tie rebate offers to their loyalty cards such that every qualified purchase ("qualified" meaning that the purchase has a rebate associated with it) by a consumer using the loyalty card is tracked automatically by the retailer. At the end of a designated period, the retailer then mails the customer a certificate that can be applied to future purchases by the consumer only at that retailer. In this way, the retailer has eliminated the paperwork for the consumer who shops and uses the loyalty card, thus providing an incentive for the consumer not only to shop at that retailer's establishment, but also to use the loyalty card and, once the certificate redeemable by the retailer is received, to return again to redeem the certificate.

Although the loyalty card-certificate system provides several advantages over the consolidated rebate system in the form of less paperwork for the consumer and for the retailer who coordinates the program, the drawback is that such a system relies on a loyalty card. Although consumers have come to expect that they need to carry a loyalty card to, for example, their grocery store, if every type of retailer were to require a loyalty card, the consumer's wallet or pocketbook would soon be bulging with loyalty cards for every retailer they patronize—drug store, office supply store, toy store, computer store, department store, shopper's club, and so forth. Additionally, there is some financial burden on the retailer that is inherent in the administration of a loyalty card system.

Therefore, there is a continued need in the field to provide a method for redeeming product marketing rebates in a fast, cost-effective, consumer-friendly manner, and for allowing retailers to gather more information about their customer's purchasing habits, without requiring a separate loyalty card to be entered as part of the transaction. Furthermore, it is desirable to provide a method that it is flexible enough to accommodate multiple formats for rebate claims.

SUMMARY OF THE INVENTION

In accordance with this invention, there is provided a method for processing one or more product marketing rebate claims submitted by a consumer in satisfaction of one or more rebate offers having a value, each rebate offer comprising an offer to provide a cash value in return for a purchase of one or more designated products. Purchase of the one or more designated products occurs in one or more qualified transactions, each qualified transaction having a transaction serial number assigned thereto. The transaction serial number is recorded in a point-of-sale data processing and storage system and recorded on a receipt issued to the consumer. The rebate processing method comprises providing a designated site connected to a global computer information network and accessible by the consumer. A rebate claim is received on the designated site, the rebate claim comprising (i) at least one transaction serial number corresponding a qualified transaction, and (ii) identifying information corresponding to the consumer. A stored data record is stored, comprising the at least one transaction serial number and the identifying information corresponding to the consumer. An electronic file transfer is received from the data processing and storage system. The electronic file transfer comprises at least one purchase data record comprising at least (i) the transaction serial number corresponding to the qualified transaction in which the at least one designated product was purchased by the consumer, and (ii) an identification of each designated product purchased by the consumer. Each stored data record is associated with a corresponding purchase data record having an identical transaction serial number, and the stored data record and the corresponding purchase data record associated therewith are then processed to validate the rebate claim. Then, the value of the rebate claim is transferred to the consumer. The designated site may be accessible to the consumer by a computer connected to the global computer information network or via a telephone connected to a computerized telephone answering system connected to the designated site and accessible by calling a designated telephone number.

After making an initial rebate claim, the consumer may choose to delay processing of the rebate claim until one of: a future instruction by the consumer to proceed, or expiration of the qualifying time period. When the consumer chooses to delay completing the method until expiration of the qualifying time period, the consumer can subsequently access the designated site and transmit additional transaction serial numbers before expiration of the qualifying time period.

The receipt issued to the consumer may comprise a dedicated accounting of the one or more designated products having rebate offers purchased by the consumer in the qualified transaction. The consumer may be issued a primary receipt and a secondary receipt, wherein the secondary receipt consists essentially of: a record of the serial number of the qualified transaction and a dedicated accounting of only designated products having rebate offers. The primary receipt comprises an accounting of all purchases by the consumer in the qualified transaction.

The above method may also be modified to allow at least one consumer to transmit information to the designated site over a global computer information network whereas at least one other consumer completes and mails a paper form to a fulfillment house administered by the fulfillment administrator and makes a rebate claim by providing the serial numbers of the qualified transactions and personal information on the paper form. The fulfillment administrator, upon receipt of the paper form, accesses the designated site of the global computer information network, enters and transmits to the designated site the other consumer's personal information and the serial numbers corresponding to the other consumer's qualified transactions, and stores as a stored data record the personal information and the serial numbers transmitted by the other consumer.

In a further embodiment, at least one consumer may purchase the one or more designated products using a smart card having a card number and a computerized data storage means, at which time the transaction serial number is stored as computerized data on the smart card computerized data storage means. The consumer can then enter the one or more transaction serial numbers and the personal information by using a smart card reader to automatically download the computerized data representing the stored transaction serial number and the card number from the smart card into a card reader. In such case, the card number comprises the personal information from which the consumer can be identified. The fulfillment administrator then transfers the cash value of the rebate claims to the consumer by crediting the smart card.

In another embodiment, the consumer may purchase the designated product using a designated card such as a credit card having a corresponding credit account, a debit card having a corresponding bank or debit account, or a smart card having computerized data storage means. The designated card is sponsored by the retail network and has a card number. In such case, the fulfillment administrator receives in the electronic file transfer from the POS system at least one transaction data record comprising the designated card number and the corresponding transaction serial number for the qualified transaction. The fulfillment administrator already has on file a stored data record comprising personal information about each consumer indexed by the designated card number, so the fulfillment administrator then associates the transaction data record with the corresponding stored data record for the designated card number. The stored data record is updated with the transaction serial number, and the remainder of the method remains the same, except that the cash value of the rebate claims may be credited to the consumer by crediting the corresponding credit account, the debit or bank account, or the smart card. The above data entry method using the designated card for data entry and transmission to the dedicated site may be integrated with the internet data entry and paper form data entry methods.

The invention also comprises a system for processing a plurality of product marketing rebate claims submitted by a plurality of consumers in satisfaction of a plurality of rebate offers in accordance with the method of this invention. The system comprises a point-of-sale data processing and storage system adapted to process purchases by consumers and to identify each qualified transaction with a serial number, and a receipt comprising a record of the serial number issued to each consumer by the point-of-sale data processing and storage system. The system further comprises means for receiving rebate claim data in an electronic format from the consumers, such as a designated site connected to a global computer information network and accessible to the consumers through the global computerized information network, or an interactive computerized telephone processing system accessible to the consumers at a designated telephone number. The rebate claim data for each consumer comprises at least one transaction serial number and a consumer identifier. At least one electronic data storage and receiving device is connected to the designated site for storing as a stored data record the data for each consumer as received by the designated site and for receiving and storing an electronic file transfer from the point-of-sale data processing and storage system. At least one data processor is connected to the electronic data storage and receiving device and is adapted to associate each serial number in each stored data record with each purchase data record containing an identical serial number, process each purchase data record and associated stored data record to validate each rebate claim, and check each validated rebate claim for fraud. Finally, the system comprises a transfer device for transferring the cash value of the rebate claims to the consumer.

The system may comprise at least one computer usable by the consumer to access the designated site on the global information network, such as a computer located at the residence or place of employment of the consumer or at an establishment operated by the participating member, such as an in-store kiosk. The transfer device for transferring the cash value of the rebate claims to the consumer may comprise a smart card adapted to receive debits and credits having cash value and means for crediting the smart card with the cash value, or may comprise a check adapted to be mailed to the consumer.

The system may further comprise a paper form adapted for the personal information to be written upon the form and adapted to be enclosed in a mailing to a paper form processor along with the one or more serial numbers. The serial numbers may be written on the form, or merely provided in some form on the receipt or copies of the receipts mailed with the form. In such case, the system also comprises a paper form processor capable of receiving the paper form and entering and transmitting the personal information and the serial numbers to the designated site on the global computer information network.

BRIEF DESCRIPTION OF DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF INVENTION

The invention will next be illustrated with reference to the figures wherein similar numbers indicate the same elements in all figures. Such figures are intended to be illustrative rather than limiting and are included herewith to facilitate the explanation of the apparatus of the present invention.

The invention comprises a method for processing one or more product marketing rebate claims submitted by a consumer in satisfaction of one or more rebate offers. A "rebate offer" comprises a promise by the manufacturer or the retailer to transfer a value to the consumer in exchange for a purchase of a designated product. The value transferred to the consumer may be in the form of cash value, such as a check, or may be an article of manufacture such as a promotional item or a coupon good for a future purchase. As with any rebate method, the first step is for the consumer to purchase one or more of the designated products from a participating member of a retail network that offers the rebate program.

Typically, a "participating member" comprises a single store in a "retail network" or chain of franchised or company-owned stores that are all operated under the same name. Where there is only a single store, however, the retail network comprises merely the single store itself, which, of course, is the sole participating member. Typically, coordinated rebate offers may be offered by retail networks that comprise a chain of similar stores selling similar goods under a single tradename. Other retail networks, however, may comprise a chain of similar stores selling similar goods under different tradenames, such as where consolidation within the industry has combined formerly independent entities with established goodwill under different tradenames in different geographic regions. Still other retail networks may comprise dissimilar stores selling dissimilar goods under different tradenames, either under the umbrella of a single parent company, or even through the co-operation of multiple parent companies who form a co-operative for any number of purposes, including merely to consolidate rebate systems.

To qualify for the rebate, the purchases of items having rebate offers must be made during a qualifying time period. The "qualifying time period" may be infinite, but is usually finite in length, such as a one or more months in duration, at which time another set of rebate offers may be provided having a different qualifying time period. The use of qualifying time periods is well-known in the art. The purchase of the item having a rebate takes place during a "qualified transaction." A "qualified transaction" is any transaction in which at least one product having an associated rebate offer is purchased by the consumer within the qualifying time period.

Figure 1:
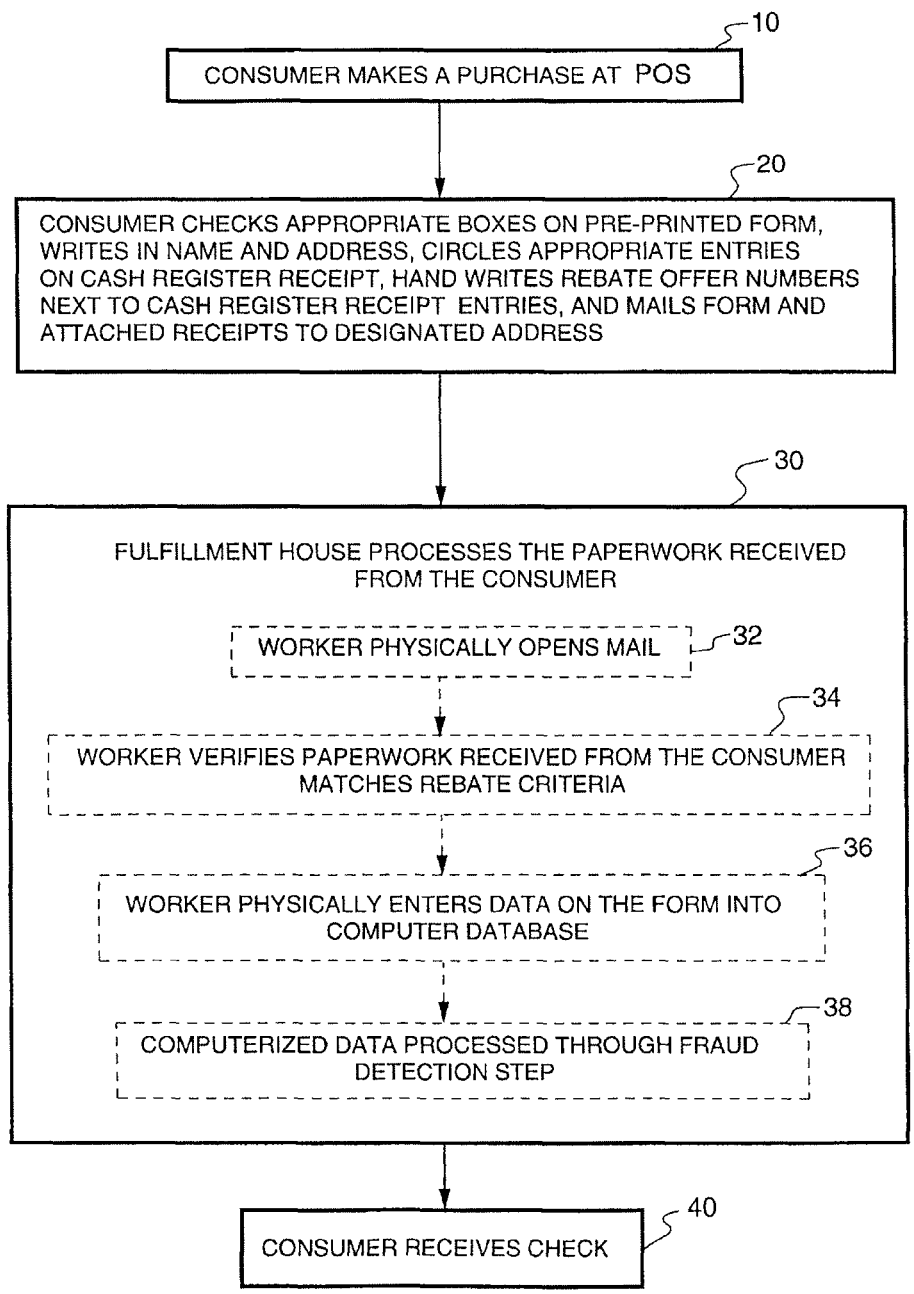
FIG. 1 is a flowchart depicting a combined rebate method of the prior art.
Figure 2:
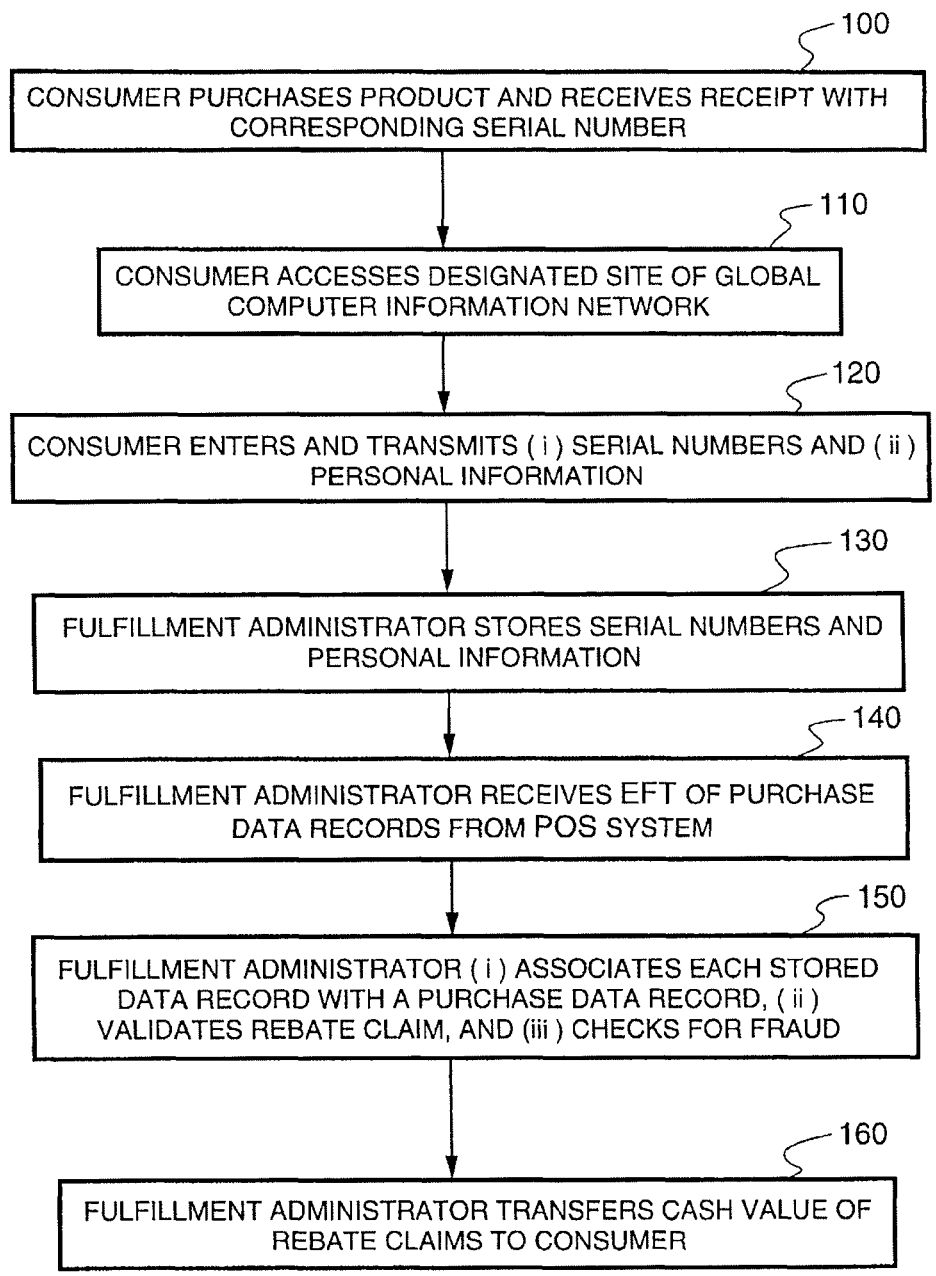
FIG. 2 is a flowchart depicting an exemplary combined rebate method according to the present invention comprising an internet data entry method.

Thus, referring now to the flowchart in FIG. 2, the first step 100 in the method of this invention comprises the consumer purchasing one or more of the designated products from the participating member in one or more qualified transactions recorded by a point-of-sale data processing and storage system. Each qualified transaction has a corresponding serial number recorded on a receipt issued to the consumer. The point-of-sale data processing and storage system is any system known in the art for recording and processing purchases at the point of sale. Such systems typically comprise a computerized system that receives data either by manual entry by an operator, or through scanning a UPC supplied on the product packaging either by the manufacturer or by the retailer. Certain data processing and storage systems are known that issue a corresponding transaction serial number or serialized code for each transaction and print that serial number on the receipt issued to the customer, sometimes as a barcode (UPC). This transaction serial number may then be used by the consumer when returning an item, for easy verification of the former purchase price. For the purposes of rebate offer fulfillment, the corresponding transaction serial number may be the same serial number typically issued by such point-of-sale data processing and storage systems, or may be an entirely different number issued solely for the purposes of keeping track of the rebate program.

Step 100 may further comprise providing on the receipt issued to the consumer a dedicated accounting of the one or more designated products having rebate offers purchased by the consumer in the qualified transaction. For example, a consumer may buy 50 items in a single transaction, of which only 5 have associated product rebate offers. As a reminder to the customer that they have qualified for rebates, a dedicated accounting of just the rebate items may be provided in a special section of the receipt or in a separate receipt. Ideally, the consumer may be provided with a primary receipt and a secondary receipt, wherein the secondary receipt consists essentially of a record of the serial number of the transaction and a dedicated accounting of only designated products having rebate offers, whereas the primary receipt comprises an accounting of all purchases in the qualified transaction, including items without associated rebate offers. The second receipt may even include information regarding how to make the rebate claim, such as "Your purchases of the items below today entitle you to receive a $5 rebate. Access www.[retailer].com today and find out how!" Or, the second receipt may let the consumer know that more items can be purchased to fulfill a certain rebate offer, such as "You purchased one bar of Brand X Soap today, purchase two more and receive a $1 rebate."

Step 110 in FIG. 2 comprises the consumer accessing a designated site of a global computer information network. A global computer information network, such as is commonly referred to in the art as the "Internet" or "World Wide Web," contains any number of sites ("websites") which a user may access. It is well-known in the art for such sites to provide information for reading or downloading and to provide user interfaces where users may transmit information about themselves, a product order, a credit card number, and the like. The software required to provide such information, and to accept and record such entries, is well known in the art. The designated site as described in this invention is administered by a fulfillment administrator, and typically comprises a computer interface residing on a powerful computer server capable of processing multiple requests from multiple uses simultaneously. The "fulfillment administrator" is any person authorized by the retail network to process rebate claims. The fulfillment administrator may be an in-house employee of the retail network or a third-party independent contractor. The term "fulfillment administrator" refers to the entity or entities responsible for processing the rebates, and as such includes anyone or anything under the control of that entity, such as but not limited to workers, programmed computers, or third-party subcontractors.

The consumer then makes a rebate claim in step 120 by entering and transmitting to the designated site (a) one or more serial numbers corresponding to the one or more qualified transactions, and (b) identifying information, such as personal information about the consumer. Thus, the consumer can merely review the receipt issued by the point-of-sale data processing and storage system, and transcribe the serial number onto an electronic form provided by the designated site. The consumer can also enter identifying information, such as their name and address, phone number, e-mail address, demographic information, and/or the like. At a minimum, the identifying information includes enough information to identify the consumer so that the rebate can be provided to the customer in a later step. The fulfillment administrator then stores the personal information and the serial numbers transmitted by the consumer as a stored data record in step 130. The data may be stored by any electronic means known in the art, which may include the same computer server on which the designated site resides, or may be a different, interconnected data storage device to which the networked computer can write and store data.

The fulfillment administrator also receives an electronic file transfer from the point-of-sale data processing and storage system comprising a plurality of purchase data records, as indicated in step 140. The electronic file transfer may be in the form of a transfer across a computer network, such as a global computer information network or a direct-dial, secure-access computer network, or may be in the form of a tangible electronic storage device containing the electronic file. Each purchase data record comprises the list of products purchased, the date, and the transaction serial number for a qualified transaction in which at least one designated product was purchased by any consumer. The purchase record may also comprise other data such as, for example, the store number. This step may occur at any time from a time simultaneous with the performance of step 100 to any time before step 150, such as on each day at the end of the day's transactions by the point-of-sale system, but may occur weekly or on another periodic basis, or may not occur until the expiration of the qualifying time period. As one advantage of this method is the speed at which claims can be processed, however, the transfer of data preferably occurs on a periodic basis throughout the qualifying time period, so that if certain customers desire, their claims may be processed before the end of the qualifying time period. The list of products purchased in the purchase data record typically comprises all of the items purchased in the qualified transaction, not just the rebate items, for reasons as described herein later. To minimize the size of the file to be electronically transferred, however, the purchase data record may be limited to only items having rebate offers. Such a limitation requires software at the point-of-sale data processing and storage system to identify rebate items, such as the software necessary to issue a secondary receipt as described above.

In step 150, the fulfillment administrator then associates each serial number in the stored data record with a purchase data record having an identical serial number. Thus, for each serial number transmitted by a customer and stored as a stored data record, there is a corresponding purchase data record with the identical serial number received by electronic file transfer in step 140. The fulfillment administrator then processes the purchase data record and the associated stored data record to validate the rebate claim, such as by using computerized software operated by or on behalf of the fulfillment administrator. For example, the computerized software matches UPC codes contained in the purchase record with a database of valid UPC codes that fulfill various offers. The software automatically verifies that the correct number of items was purchased and that the date of the purchase was within the qualifying period. The software can also automatically process variable rebate offers by identifying the total amount based on the number of purchases, or by identifying the purchase price or substituting the maximum or minimum price if the purchase price is out of range. Thus, the computerized software automatically determines from the purchase data record exactly which product purchases have associated rebate offers, and keeps a running total of the total amount of rebates owed to each customer.

The validated rebate claim preferably can then be checked for fraud, comparing the name and address of the consumer to known databases, as is known in the art and described in the background section above. The fraud-checking step can be performed in the same way as is known in the art for data entered by the fulfillment administrator from paper rebate claim submissions. Optionally, this step may be omitted.

After the validated rebate has been cleared for issue, the fulfillment administrator transfers to the consumer the cash value of all rebate claims satisfied by the consumer within the qualifying time period. The cash value may be in form of a check made out to the consumer, a credit to a smart card, a credit to a bank or credit account, or a certificate for redemption only at a participating member of the retail network. As used herein, a "smart card" refers to a credit or debit card having data storage means on the card, such as a magnetic strip and/or an integrated circuit chip, the storage means capable of storing electronic data that can be read and written by a card reader/writer, allowing the card to store, for example, a running account balance on the card itself. Such cards are well-known in the art.

Because a consumer can come home immediately after making a purchase in step 100 and access the designated site in step 110, some consumers may wish to receive their rebate as soon as possible. Thus, the rebate method may further comprise the designated site interactively prompting the consumer in step 120 to choose whether to proceed to method step 160 immediately or to delay performing step 160 until (i) a future instruction by the consumer to proceed or (ii) expiration of the qualifying time period. In this way, a consumer who knows he or she will not return to any store in the retail network during the remainder of the qualifying period, can release the information for processing immediately. On the other hand, another consumer may prefer to transmit the rebate information to the designated site as soon as he or she returns from the store so as not to forget to do so for that receipt, but still may wish to wait to see whether he or she makes more qualifying purchases during the qualifying period before releasing the information for processing. In such case, the consumer may choose to delay further processing until further instruction or until the end of the qualifying time period. Therefore, if the consumer makes another purchase, he or she can access the site again, enter additional transaction serial numbers, and either release the information at that time, or choose to delay again. At the end of the qualifying time period, the system automatically releases all stored information for processing. Thus, steps 110 to 130 can be repeated numerous times before advancing to steps 150 and 160 (step 140 will occur at whatever interval is designated by the retail network or fulfillment administrator, regardless of the timing of the other steps). In such case, each additional step 130 comprises modifying the stored data record to include the additional serial numbers.

When the consumer accesses the designated site a second or subsequent time, the site may automatically recognize the consumer after transmitting only a portion of the personal information transmitted during the first access session, such as the name and zip code only, phone number only, e-mail address only, or any other limited portion of the consumer's personal information as deemed necessary. During the first visit to the designated site, the customer may be able to choose a username and password that can be entered during subsequent visits, and thus the username and password may constitute the partial information entered to be recognized. In such case, the designated site may interactively fill-in the computerized form with the remainder of their personal information upon entry of the partial information, or the site may prompt the consumer with a menu of addresses having the same name entered. From this menu, the consumer may merely choose which personal information is his or hers, and no further entry of personal information may be necessary, except to modify any information as necessary. The partial personal information transmitted by the consumer may require no entry at all, but instead may merely comprise information automatically transmitted by the consumer, such as a "cookie" saved on the consumer's computer from a previous visit to the designated site. The use of "cookies" in a global communications network is well-known in the art.

Recognizing the consumer on subsequent visits may be used in conjunction with the method where the consumer may enter multiple serial numbers during multiple access sessions within the same qualifying time period, or can also be used where the same consumer makes rebate claims under multiple programs within different qualifying time periods. Thus, a single consumer may only have to enter personal information into the system a single time. This single entry may be for a single retail network, or, because the fulfillment administrator may service several different retail networks each having different coordinated rebate offers, the single entry of personal information may establish an account with the fulfillment administrator that may be used for multiple retail networks. Thus, a consumer entering an internet rebate claim for a drug store chain by accessing that drug store chain's website may later access an office supply store's website and find that they do not need to enter detailed personal information again. This may occur where the same fulfillment administrator services both retail networks and the personal information data is shared across both rebate programs. In addition to having a streamlined entry process available to the customer for subsequent entries, the customer on a subsequent visit may further be able to check the status of a pending rebate submission, check their account history, or have a choice of other options.

It should be understood here that the "designated site" accessed by the consumer may be accessed in a number of ways. For example, the consumer may access the designated site by accessing a menu choice on a website of the retail network offering the rebate program. The consumer may also access the designated site by accessing the fulfillment administrator's website directly. Certain manufacturers may also wish to provide links from the manufacturer's website to retailers or fulfillment administrators that offer their rebates to consumers. Thus, although the designated site may appear to the consumer to be a part of, for instance, a drug store's website, it may in fact be the fulfillment administrator's website that is merely linked to the drug store's website. The manner in which the consumer actually accesses the designated site is immaterial to this invention. It should also be noted that although the designated site is necessarily connected to the global computer information network, access to the system does not necessarily have to occur through that network. For example, an in-store kiosk may be directly linked to the designated site or, where the fulfillment administrator enters data from a paper form submitted by the consumer, the fulfillment administrator may be directly linked to the designated site without the need to first access the internet or world wide web. A direct link to the designated site may provide a more secure connection than a connection through the internet, which may also be appealing to certain consumers wishing to take advantage of an in-store kiosk. Access to the designated site may also be by telephone without the use of a computer terminal, as will be discussed herein later.

From the information submitted by the consumer, the fulfillment administrator may compile a marketing record for each consumer, as shown in step 135 of FIG. 2. Each marketing record may comprise the personal information about the consumer and one or more consumer purchasing preferences derived from the purchase data records of the qualified transactions for which the consumer transmitted the corresponding serial number in step 120. A "consumer purchasing preference" may be simply the full list of items purchased during the qualifying transaction, or it may be information sifted from the purchase data record after analysis. For example, the consumer purchasing preference may show that the consumer is a good candidate for cat products, based on information in the purchase data record showing purchase of cat food. This marketing record may then be provided to a marketing agent, such as a marketing agent of the retail network who may then target the consumer to receive special offers related to products or types of products that they routinely purchase. The marketing agent may optionally be the fulfillment administrator or someone authorized by the fulfillment administrator to perform such services, a product manufacturer, or a third party having an interest in consumers with certain purchasing habits.

Although in the examples described above, step 110 comprises a consumer accessing the designated site via a personal computer, presumably at the consumer's home, the simple fact remains that not every consumer can be expected to have a computer with internet access, nor can every consumer be expected to want to use an internet-based system. Thus, step 100 may comprise not only a consumer accessing the designated site from his or her own computer, but also accessing the designated site from a computer located at the retail network, such as in an in-store kiosk. An in-store kiosk typically comprises essentially a computer or computer terminal that provides access to the designated site along with an interactive data entry system, perhaps in a format more user friendly to less internet-savvy consumers. In one embodiment, the designated site may be located merely on a computer information network that is not globally accessible by the internet, but rather accessible only through such in-store kiosks or other designated portals within a limited network.

Also, the present method may also be used in conjunction with a paper rebate-claim system. In such a system, a plurality of consumers make purchases and are issued receipts having serial numbers as described above. Also, similar to the process shown in FIG. 2, at least one consumer accesses the designated site of a global computer information network and makes a rebate claim by entering and transmitting the serial numbers of the qualified transactions and personal information to the designated site. The fulfillment administrator stores as a data record the personal information and the serial numbers transmitted by the one consumer.

Figure 4:
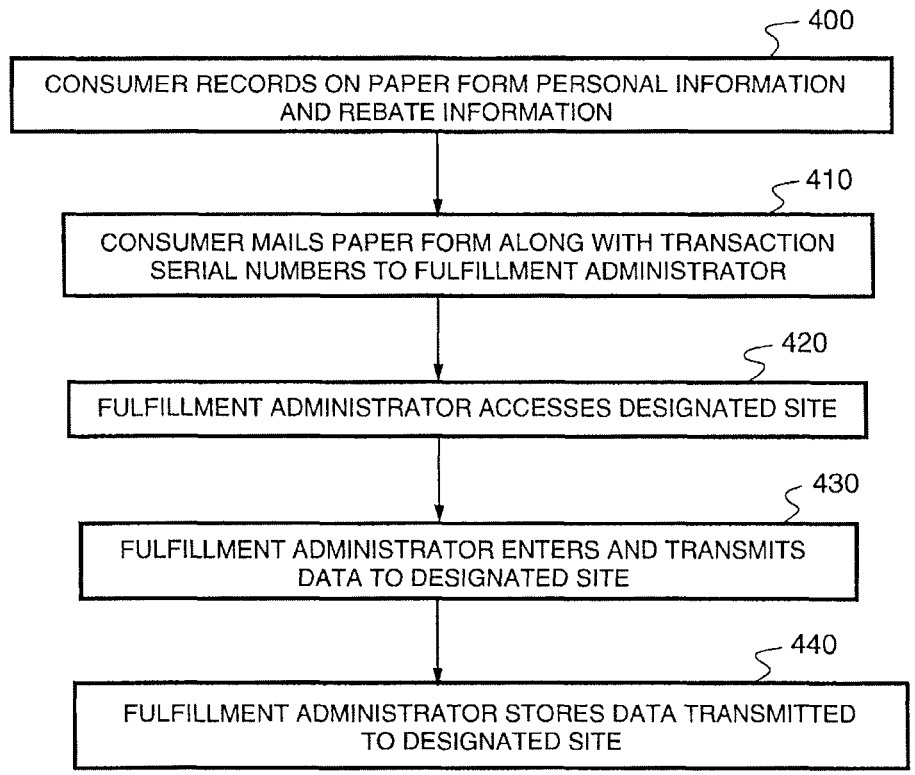
FIG. 4 is a flowchart depicting an exemplary paper-form data entry method capable of being integrated with the flowchart in FIG. 3.

Additionally, at least one other consumer may complete and mail a paper form to the fulfillment administrator using a paper-form data entry method depicted in FIG. 4. This consumer makes a rebate claim in step 400 by recording personal information on the paper form and also providing the serial numbers of the qualified transactions. The serial numbers may be provided by writing them on the paper form, or more advantageously, the receipts or copies of the receipts may be enclosed with the form. The form and serial numbers are then mailed to the fulfillment administrator in step 410. The fulfillment administrator, upon receipt of the paper form, then accesses the designated site of the global computer information network in step 420, enters and transmits the other consumer's personal information and the serial numbers corresponding to the other consumer's qualified transactions in step 430, and stores as a stored data record in step 440, the personal information and the serial numbers transmitted to the designated site. For receipts having the serial number encoded thereon as a barcode, the fulfillment administrator may reduce processing time by scanning-in the serial number via a barcode scanner. A bit-scanner coupled with a alphanumeric recognition software known in the art may also be used to increase processing time, the scanner being used to scan in numbers either from the paper form or from the receipt or copy of the receipt. The stored data record thus created by the fulfillment administrator is essentially the same as if the consumer had created it himself or herself by internet access, except that as part of personal information, there may be background or demographic information related to how the data was entered.

The remaining steps are the same as described above and shown in FIG. 2, in that the fulfillment administrator receives an electronic file transfer from the point-of-sale data storage system comprising a plurality of purchase data records: associates each serial number in each stored data record to each purchase data record containing an identical serial number; processes each purchase data record and associated stored data record to validate each rebate claim, and checks for fraud; and transfers the cash value of the rebate claims to the consumer.

Yet another way for a customer to access the designated site of the global computer information network and to provide rebate claim data in an electronic format, is by telephone. Once a data record has been established for that consumer either through entry of information through the global computer information network via a home terminal or a kiosk, or through paper submission, the consumer may then make a subsequent rebate claim by telephone. Thus, for example, the first time a consumer enters information via submission through the global computer information network, the customer may be given a customer number and a numeric password. The customer number may, for example, be the consumer's phone number, social security number, or the like, or merely an arbitrary or meaningful assigned or customer-selected number. The numeric password may be selected by the consumer or assigned. For simplicity, the customer number and password may be the same username and password used for access via the global computer information network, or the customer may have an alphanumeric username and password for use via computer and a numeric username and password for use by telephone. Where a consumer's first entry is by paper submission, a return mailing may be sent to the customer or the customer may be contacted by telephone to provide them with their customer number and numeric password. Once the customer has a customer number and numeric password, the customer may then place a telephone call to a predetermined number, such as a toll-free number, where the customer can submit rebate entries by telephone.

Connected to the predetermined telephone number is an interactive computerized telephone processing system as are commonly known in the art, such as are used for voice-mail access, brokerage or benefits-plans access. Upon reaching the interactive computerized telephone processing system, the customer may be presented with a menu of choices, one of which is to enter a customer number and password. The requested data is received by the designated site, such as in the form of the tones generated by the numeric keys of the touch-tone telephone, as is well-known in the art, or through the use of voice-recognition software as is also well-known in the art for recognizing spoken responses given by the caller. It should be noted here that the interactive computerized telephone processing system may be directly connected to or integral to the designated site, or may be remotely connected to the designated site through the global computer information network and adapted to transmit the information entered by the telephone to the designated site. In an alternative embodiment, the interactive computerized telephone processing system may be a stand-alone system not connected to a designated site on the global computerized information network at all. Upon entering the customer number and password successfully, the customer may be presented with a further menu of choices, one of which is to enter a transaction code corresponding to a receipt from a qualified transaction. The transaction code information is then stored in the storage device and processed in the same manner as submissions submitted by paper or by electronic submission by computer. Other menu choices, once a customer has successfully entered the customer number and password, may include, for example but not limited to, release of a previously-entered set of qualified transaction codes for further processing, checking the status of a pending, previously-submitted rebate submission, changing the password, or talking to a service representative.

One advantage to using the customer's phone number as the customer number for telephone entries is that existing caller identification technology can be employed to automatically detect the customer number given the telephone number from which the customer is dialing. Thus, the first menu choice may be to merely enter the password if the customer is calling from the telephone number corresponding to their customer number, or to enter, for example, an asterisk plus their customer number, if the customer is not dialing from the telephone number corresponding to their customer number.

Figure 5:
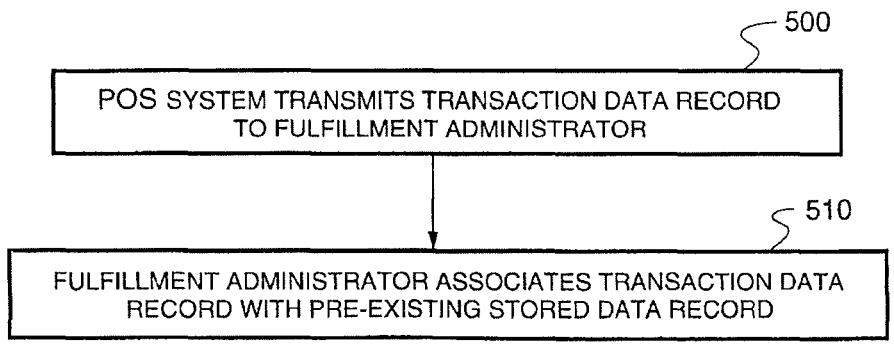
FIG. 5 is a flowchart depicting an exemplary card-based data entry method capable of being integrated with the flowchart in FIG. 3.
Figure 6:
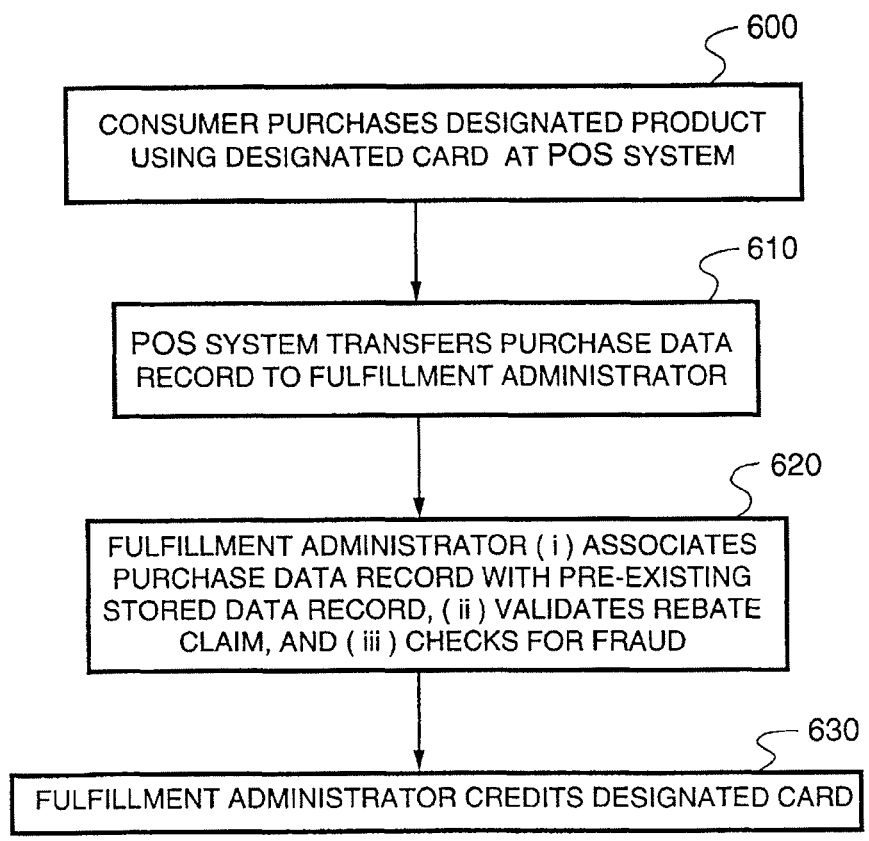
FIG. 6 is a flowchart depicting an exemplary combined rebate method according to this invention comprising a card-based data entry method.

In another embodiment of this invention, a method for electronic processing of rebate claims may integrally incorporate the use of a designated card, such as a smart card, credit card, or debit card. Use of the designated card by the consumer, in particular a card issued by the fulfillment administrator acting as an umbrella for a large retail network of otherwise unrelated retailers, may trigger automatic access of the designated site on behalf of the consumer. Thus, for a consumer using a designated card, the consumer may automatically make a rebate claim for any product purchased with the card. Such automatic access may occur from the POS data processing and storage system without further action by the consumer as shown in FIGS. 5 and 6, which are explained herein later. In the case of a smart card which has data storage capacity on the card, the smart card may instead receive and store data from the POS system, such as the transaction serial number, and the consumer may then access the designated site in step 110 as shown in FIG. 2, and automatically enter the serial number data and personal information in step 120 via insertion of the smart card in a card reader/writer. The data may then be transmitted to the designated site without manual entry by the consumer. If the consumer has a refund waiting at the designated site to be credited to his card from a previous rebate claim submission, the credit can also be written to the card while during such a procedure.

For either a smart card or for standard credit or debit cards without data storage capacity, merely using the card at the POS system may trigger an automatic download of the card number and the transaction serial number to the designated site, as shown in FIGS. 5 and 6. Such a card-based data entry method may be integrated with the internet data entry and paper-form data entry methods described and shown above in FIGS. 2 and 4. As depicted in FIG. 5, a card based data entry method simply comprises the POS system transmitting a transaction data record to the fulfillment administrator in step 500. Such a transmission may be part of the electronic file transfer of purchase data, or may occur immediately, at the end of a day's transactions, or at some other periodic interval as a separate file transfer. The designated site, having a record of the credit card number linked to the consumer's personal information, may then in step 510 create or update the consumer's stored data record to reflect the transaction serial number for which the designated card was used. On the other hand, because the purchase data includes the card number, the stored data record may comprise only the consumer's personal information including the card number, and each purchase record may be associated with the stored data record only by card number. The designated card may then be automatically credited with the rebate cash value upon processing of the rebate claim. In the case of a smart card, the card reader/writer credits the card during a subsequent data transfer step; in the case of a debit card, the associated bank or debit account is credited; and in the case of a credit card, the credit account is credited.

The designated card method used on its own without integration with the other data-entry methods provides optimal minimization of steps in the rebate fulfillment process. In the stand-alone method, the consumer purchases the designated products using the designated card in step 600. In step 610, the point-of-sale data processing and storage system transfers the purchase data record to the fulfillment administrator by electronic file transfer. The electronic file transfer comprises (i) the transaction serial number, (ii) the designated card number, (iii) the transaction date (where there is a fixed expiration date for the rebate offer), and (iv) the list of products purchased by the consumer. As the fulfillment administrator already has on file a stored data record comprising personal information about each consumer indexed by the designated card number, the fulfillment administrator then may (i) associate the purchase data record with the stored data record, (ii) process the purchase data record and corresponding stored data record to validate the rebate claim, and (iii) optionally, check for fraud in step 620. Finally, in step 630, the fulfillment administrator credits the designated card with the cash value of the rebate claims by crediting the credit card, debit card, or bank account, or crediting the smart card. Because the purchase data record used in this method already has the consumer's personal information in the form of the card number that may be associated with the stored data record that holds the consumer's other information such as name, address, and the like, the stored data record does not need to be updated with new information as a result of the transaction, unlike the method depicted in FIG. 2. Instead, the fulfillment administrator merely stores the purchase data record and can associate the purchase data record with the stored data record via the card number, rather than by the transaction serial number.

Where the rebate offer typically requires only one consolidated rebate claim submission per qualifying period, the rebate claim may be processed at the end of the qualifying period, or the rebate rules may allow processing of multiple rebate claims for consumers using the card (the particular number of rebate claims per specific item still being limited by manufacturer's rebate rules). Thus, each time the card is used for a rebate item, the rebate claim method may proceed in full.

The rebate redemption method involving use of a designated card may be integrated with the internet-based and/or paper-form-based data entry methods, wherein the stored data record for each consumer may be updated by use of the card, consumer access of the designated site, or the fulfillment administrator accessing the designated site after receipt of a paper form from the consumer. Thus, different consumers participating in a single consolidated rebate offer may have a choice of at least three different ways of claiming their rebate: (i) accessing the designated site themselves either via a home internet connection or via an in-store kiosk, (ii) using a designated card, or (iii) sending in a paper form. Similarly, where a consumer uses the designated card for one qualified transaction, but uses a different means of payment for an other qualified transaction, the consumer may enter the serial number for the other qualified transaction via internet access or the paper form methods. The common end result of the transaction serial number and personal information being stored as a stored data record via all three data entry methods prevents duplicate entries from being validated and allows interchangeability and integration of the methods.

A particular benefit of the designated card entry system is that the retail network may comprise a number of unrelated retail chains that can contract with a single fulfillment administrator to track purchases using the designated card to automatically qualify for refunds. Such retailers may also contract with the fulfillment administrator to administer consolidated rebate claims via the Internet and paper submission as described above. Thus, a consumer may be able to use his or her card at any of several retail establishments to automatically receive refunds credited to his or her account regardless of at which retailer the product was purchased. Such a card preferably may also be acceptable for universal use as a standard credit or smart card even at retailers that are not members of the network, as long as the retailer accepts the particular brand of card, such as VISA®, MASTERCARD®, AMERICAN EXPRESS®, DISCOVER®, DINERS CLUB®, or the like. The automatic rebate claim offers an incentive for the consumer to use the card as often as possible, even if the consumer is unaware of pending rebate offers, just in case the transaction is a qualifying transaction. The key to a consumer getting a rebate via use of the card, however, is that the retail establishment must share the transaction serial code data with the fulfillment administrator. Thus, the consumer also has incentive only to shop at participating members of the retail network, thus providing incentive for retailers to become part of the retail network.

Use of the designated card may trigger a purchase data record to be sent to the fulfillment administrator even where no rebate item was purchased. Thus, because the list of all purchases may be collected for consumers using the designated card, the purchasing profile collected for that consumer may be broader than provided by the internee-based or paperform-based data entry methods, and thus the marketing record may be more valuable.

Among the advantages of the designated credit, debit, or smart card data-entry method over the collection of purchasing data and processing rebate claims via a loyalty card, is that the designated card is acceptable as legal tender beyond just the members of the retail network. In this way, the need for a consumer to carry multiple loyalty cards may be eliminated. Furthermore, the credit received to the designated card or corresponding account is usable beyond the retail network providing the card.

Figure 3:
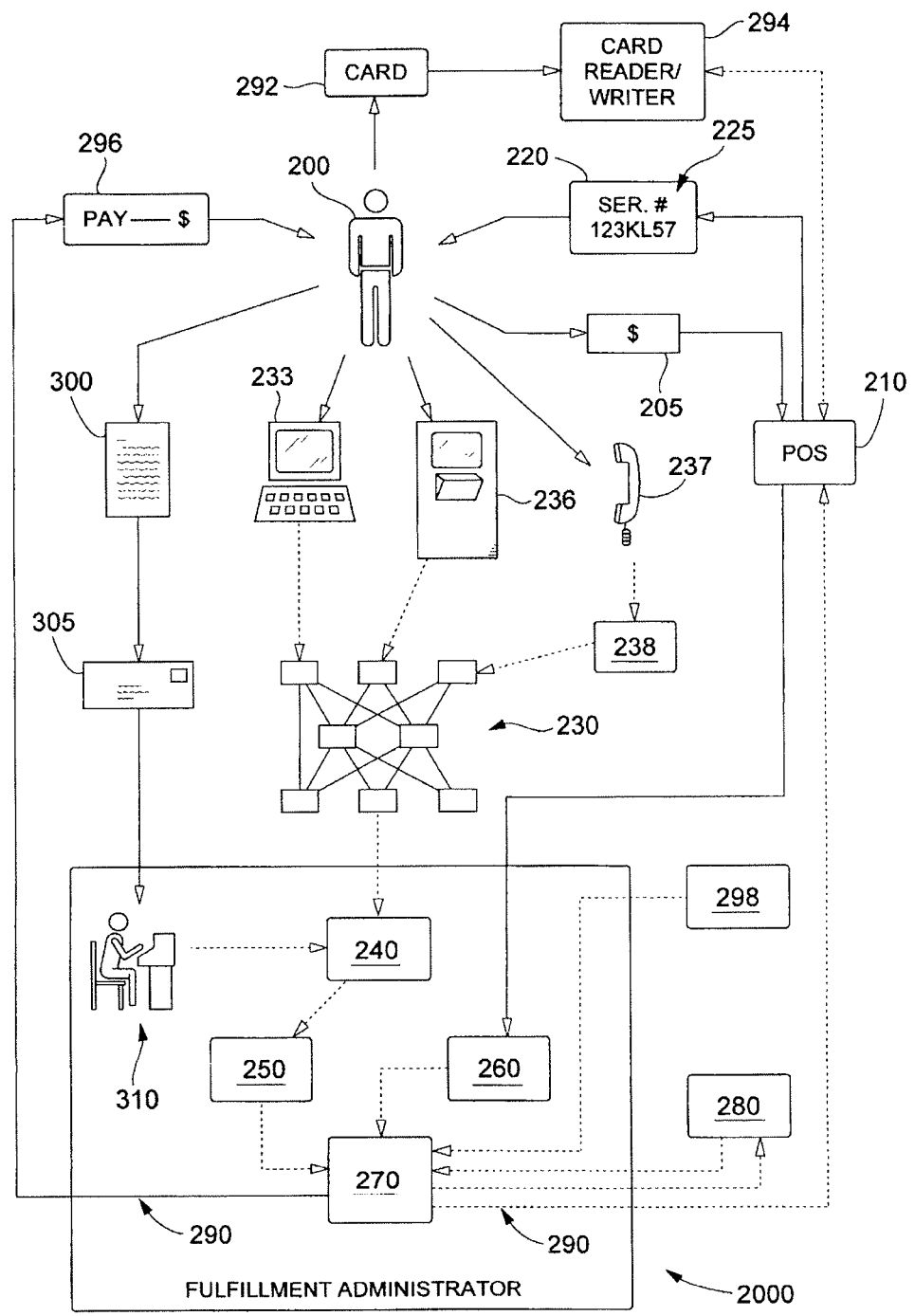
FIG. 3 is a schematic illustration depicting an exemplary system of the present invention.

Referring now to FIG. 3, there is shown schematically an exemplary system 2000 of the present invention. System 2000 comprises a point-of-sale data processing and storage system 210 adapted to process purchases by consumers 200 and to identify each qualified transaction with a serial number 225. As shown in FIG. 3, consumer 200 conducts a qualified transaction by making a payment 205, such as by cash, check, credit card, debit card, smart card 292, food stamps, gift certificate, or any at form of legal tender recognized in commerce. System 2000 further comprises a receipt 220 issued to each consumer by point-of-sale data processing and storage system 210, each receipt comprising a record of serial number 225. System 2000 further comprises a global computer information network 230 having at least one designated site 240 connected thereto and adapted to receive data from the plurality of consumers, the data for each consumer comprising one or more serial numbers of qualified transactions and personal information about the consumer. Thus, consumer 200 can access designated site 240 through global computer information network 230 so that he or she may enter and transmit the serial numbers and personal information. Consumer 200 may access network 230 in any number of ways, such as, for example via a computer, such as a computer 233 located at the residence or workplace of the consumer or an in-store kiosk 236 provided by a retail network, or via a telephone 237 connected to an interactive computerized telephone processing system 238.

System 2000 further comprises an electronic data storage and receiving device 250 for storing, as a stored data record, data for each consumer as received by designated site 240 and an electronic data storage and receiving device 260 for receiving and storing an electronic file transfer from point-of-sale data processing and storage system 210. Devices 250 and 260 may be separate devices as shown in FIG. 3, or integral portions of a single electronic data storage and receiving device. The electronic file comprises a purchase data record for each qualified transaction involving at least one designated product. Each purchase data record includes transaction serial number 225. At least one data processor 270, such as computer software located on a computer, associates each serial number in each stored data record with each purchase data record containing an identical serial number and processes each purchase data record and associated stored data record to validate each rebate claim. Devices 250, and 260, as well as processor 270 and/or designated site 240, may all be integral portions of a single computer or server, or may be connected parts of a computer network. Such a computer or server may typically be housed at the offices of the fulfillment administrator, or may be operated offsite on the fulfillment administrator's behalf by a computer service subcontractor, or portions may be located at different facilities and connected together either through dial-up means, direct lines, or the global computer information network. Storage and receiving devices 250 and 260 may'include disk drives, tape drives, CD-ROMs, or any other means for storing electronic information known in the art.

System 2000 also may comprise a data processor 280 for checking for fraud. Data processor 280 may also be located within a single computer or server or housed and operated in the same location as site 240, devices 250 and 260, and processor 270, or may be operated by a remotely-located third party. Data processor 280 may comprise any computer hardware and/or software known in the art. Where the fraud-checking data processor 280 is operated by a third party, an electronic file transfer of data is made to processor 280, which evaluates the data, and returns a report indicating any fraudulent or potentially fraudulent entries.

Finally, system 2000 comprises a transfer device 290 for transferring the cash value of the rebate claims to the consumer. As shown in FIG. 3, transfer device 290 is connected to processor 270 because, for example, the computer software that validates the rebate claim may then automatically transfer the cash to the consumer in some form. Transfer device 290 may comprise a smart card 292 adapted to receive debits and credits having cash value and means 294 for crediting the smart card with the cash value, such as a card reader/writer 294, shown in FIG. 3 in communication with POS system 210. Thus, for instance, where smart card 292 can be credited and debited by the retailer who offers the coordinated rebate program, the cash value may be transferred to the retailer who can then credit the consumer from the point-of-sale system 210 during the next visit. In the alternative, card reader/writer 294 may be in communication with home computer 233 or kiosk 236 such that the consumer may access designated site 240 via either the home computer or the kiosk and receive the credit. In the alternative, the means for transferring the cash value may be in the form of a credit of funds to an account 298 such as a bank account, debit account, or credit card account, in the form of a physical embodiment 296 such as a check or gift certificate mailed to the consumer, or in the form of any legal tender known in commerce.

In accordance with the method described above, system 2000 may further comprise a paper form 300 adapted for consumer 200 to write the required personal information upon the form and enclose the form in a mailing 305 along with the one or more serial numbers to a paper form processor 310. The serial numbers may be written on the form or enclosed on the receipts or copies of the receipts, and may be encoded as a barcode on the receipt or copy. Paper form processor 310, such as the fulfillment administrator and any associated processing apparatus such as a barcode scanner or other type of automatic coding means, then can receive the paper form and/or receipts and enter and transmit the personal information and the serial numbers to designated site 240. Again, access to site 240 may be through global computer information network 230, or, as shown in FIG. 3, direct.

It should be apparent that the present invention offers many benefits over the system of the prior art. One important benefit is that the time required to process rebate claims can be compressed from several weeks to a matter of days. Assuming that the fulfillment administrator has already received the electronic file transfer of purchase data by the time the consumer enters the serial numbers and personal information, the check can be cut the same day the data is received, wherein the only delay before receipt by the consumer stems from the mail delivery time. Thus, payment methods to the consumer such as crediting bank accounts to credit cards may occur the same day as the information is released.

Because the internet-, telephone-, and card-based methods comprise no manual steps, there are great cost savings in eliminating the steps of opening mail and entering data manually. Although in one embodiment, the method still allows for some paper based claims, the number of paper-based claims is minimized, thus greatly reducing the staff needed to process claims. There is also less cost to the consumer in the avoidance of postage, envelopes, and optional photocopies needed to submit a paper entry.

Another benefit inherent in the elimination or reduction of manual entries made by the fulfillment administrator is a reduction in data entry errors. Although an individual consumer can still make an error keying in information, the consumer is more likely to catch errors upon review, as the consumer has only one entry to review, not thousands a day. Furthermore, data processors transcribing data handwritten on paper forms may have to contend with difficulty in reading the consumer's handwriting or even with a language barrier, as the relatively cheap labor required to make such processing affordable may occur outside of the country and/or outside the native language in which the rebate claims originate. Neither of these problems is present with internet-, telephone-, or card-based rebate claims.

Also, retailers using the method of this invention may enjoy a reduction in fraudulent activity. Because the individual serial numbers for each qualified transaction are unique, a fraudulent consumer cannot just manufacture any authentic-looking cash register receipt and successfully claim a rebate. Similarly, because the standard serial number issued by POS systems known in the art is also entered during returns of items, consumers purchasing a rebatable item, returning it, and still trying to claim a refund will be identified by the serial number of the transaction. Even if a consumer were to receive the check and then return the item after having check-in-hand, that consumer can be identified as someone who has fraudulently claimed a rebate once, and thus can be entered into the fraud checking database for the next time.

Because of the computerized nature of the method, the consumer may be able to get a status check on his or her refund claim 24-hours a day, merely by accessing the designated site. The designated site, upon recognizing the consumer from whatever personal information is required, can provide a status check telling the consumer exactly what data has been entered so far, whether that data has been released for the next step in the method, if it has been released, at what step in the method it currently resides (fraud check, check printing, etc), and on what date, for example, the check was printed, funds were wired to the bank account, or funds were wired to the retailer for updating a smart card upon the next visit.

Another added benefit may be enjoyed by the retailers and the fulfillment administrators, who, through the use of this method of rebate fulfillment, are able to put names and addresses with purchasing patterns far beyond just products having rebates, without requiring use of a loyalty card. The ability to analyze purchase data to create marketing lists of customers with particular purchasing habits, makes the rebate process more profitable to the retailer and/or to the fulfillment administrator, through the ability to market the customer lists to third parties.

Retailers, the fulfillment administrator, and even product manufacturers providing the rebate offers, may also be able to access the stored information via telephone or the global computer information network to analyze activity related to the rebate offer. Each party may have different levels of authorized access. For example, a product manufacturer may have an alphanumeric username and password for entry over the Internet and/or a numeric customer number and password for entry over the telephone, that allows that manufacturer access to information regarding how many rebate offers have been processed for their particular product in a particular time frame. The manufacturer may also be able to receive, via the Internet, a data file listing the names and addresses of people who have submitted entries for the manufacturer's product. The retailer may similarly have access codes allowing them access to information or reports related to all rebate offers submitted related to their retail establishment. The fulfillment administrator may have access to information and reports related to all rebate offers for all such retailers.

Finally, the ease of use of this method, coupled with the fast turnaround and less cost to the consumer, encourages increased rebate claims, increased purchases of rebate items, and increased patronage of retailers offering the method of this invention for rebate fulfillment. The increase in rebate claims combined with the increase in purchasing information provided about each consumer, increases the value of the consumer information gathered by this method.

In addition to the method and system embodiments provided herein, the invention also comprises a computer program product comprising at least one program storage device, such as computer software, readable by a machine, such as computer hardware, tangibly embodying a program of instructions, such as computer code, executable by the machine to perform the method steps for processing a product marketing rebate claim as described herein. The invention may comprise a single program storage device readable by a single machine, or a plurality of discrete program storage devices, each readable by a different machine, the machines being linked to one another. Such program storage devices may process the transfer of funds to the consumer by directly electronically transfer funds to the consumer in the form of a credit to a smart card, bank account, or credit card, or may merely print a check or certificate, which is then mailed to the consumer.

It should also be recognized that although the various methods described herein have been described primarily for use in conjunction with one another in a combined offering, each method may stand alone and still provide benefits over existing processes. Thus, in its most basic form, the invention comprises a method for processing a rebate claim comprising receiving from a consumer the transaction serial code of the transaction during which the rebate item was purchased, and then matching that code with a data record containing that code and the list of rebate products purchased, as provided by the point-of-sale data processing system. The transaction serial code may be received via access to a global computer information system, by telephone or through a computer such as a home computer or a kiosk, via direct telephone access or direct computer access, or by a paper mailing. An e-mail containing the transaction serial code could also sent to a designated e-mail address without navigating the Internet through a browser. The paper mailing method may be further enhanced by the use of a designated postcard that may be processed by a data processor without having to open envelopes, saving yet another step over existing processes. Such postcards may further be adapted to be received by automated postcard processing equipment to automatically position the postcard where a data processor can read and enter the data, and then index to a next card upon the command of the data processor. Document processing equipment for providing such process steps is well known in the art.

Those skilled in the art having the benefit of the teachings of the present invention as set forth hereinabove, can effect numerous modifications thereto. These modifications are to be construed as being encompassed within the scope of the present invention as set forth in the appended claims.

What is claimed:

1. A method of using a computer processing system to process a rebate claim from a purchaser corresponding to at least one purchase transaction, wherein the rebate claim is triggered by involvement during the purchase transaction of a designated account associated with the purchaser and having an account identifier, the method comprising the steps of:
    (a) receiving, in the computer processing system, purchaser information comprising personal information about the purchaser, including the account identifier corresponding to the designated account, and storing the purchaser information as a stored data record accessible by the computer processing system;
    (b) receiving and storing in the computer processing system promotion information comprising one or more promotional offers associated with one or more promoted products, each promoted product having a product identifier, each promotional offer having a value;
    (c) receiving and storing in the computer processing system purchase information corresponding to the at least one purchase transaction, the purchase transaction comprising use of the designated account as an instrument of payment for the purchase transaction, the designated account comprising a credit card account, a debit card account, or a bank account and having an account identifier, the purchase information comprising at least the purchaser's designated account identifier and at least each product identifier corresponding to each promoted product purchased in the at least one purchase transaction;
    (d) using the computer processing system to associate the purchase information with the purchaser by matching the purchaser's designated account identifier in the purchase information with the designated account identifier in the stored data record;
    (e) using the computer processing system to validate the rebate claim by matching the product identifier corresponding to each promoted product in the stored purchase information to the promotional offer associated with that product identifier in the stored promotion information, and
    (f) providing a collective value associated with the rebate claim to the purchaser as a credit.

2. The method of claim 1, wherein the credit comprises a credit to the designated account.

3. The method of claim 1, wherein the one or more promotional offers has a qualifying time period associated therewith during which purchase transactions must be made, and wherein step (e) is performed for a plurality of rebate claims corresponding to a plurality of purchase transactions made during the qualifying time period.

4. The method of claim 3, wherein the purchase information includes a transaction identifier associated with the transaction and step (d) comprises updating the stored data record to associate the transaction identifier with the purchaser.

5. The method of claim 4, comprising processing the plurality of rebate claims in a single processing event covering the qualifying time period.

6. The method of claim 5, comprising crediting the account at the end of the qualifying time period.

7. The method of claim 3, comprising processing the plurality of rebate claims in a plurality of processing events during the qualifying time period, each event corresponding to one rebate claim.

8. The method of claim 3, further comprising providing an online user interface directly accessible by the purchaser.

9. The method of claim 8, further comprising receiving an instruction from the purchaser prior to the end of the qualifying period via the online user interface authorizing completion of rebate claim processing.

10. The method of claim 1, comprising performing the method for a single purchaser for a plurality of rebate claims including at least a first rebate claim associated with a first purchase transaction conducted by a first establishment and a second rebate claim associated with a second purchase transaction conducted by a second establishment.

11. The method of claim 10, wherein the first establishment and the second establishment are unrelated to one another.

12. The method of claim 11, wherein the first establishment and the second establishment are participating members of a common network for processing rebates associated with purchases using the designated account.

13. The method of claim 12, wherein the designated account has a designated card associated therewith.

14. The method of claim 13, wherein the card is a credit card or a debit card that is legal tender for making purchases from establishments outside of the common network.

15. The method of claim 1, wherein the rebate claim is automatically processed after the purchase transaction without further action from the consumer.

16. The method of claim 15, wherein providing the purchaser with the collective value comprises providing the purchaser with a credit not available to the purchaser until after the purchase transaction in which the one or more promoted products associated with the credit were purchased.

17. The method of claim 5, further comprising:
    providing a user interface accessible via a global computer network and configured to permit direct user submission of rebate claims, each directly submitted rebate claim comprising the transaction code associated with the purchase transaction and information sufficient to associate the rebate claim with the consumer, and
    receiving in the computer processor, prior to the end of the qualifying period, at least one rebate claim comprising use of the designated account and at least one directly submitted rebate claim from the purchaser via the user interface.

18. The method of claim 1, further comprising compiling marketing information about the consumer based upon the purchase information associated with the consumer, the marketing information comprising information regarding at least one product of expected interest to the consumer based upon a prior consumer purchase.

19. The method of claim 18, further comprising targeting the consumer with a marketing offer based upon the marketing information compiled about the consumer.

20. The method of claim 1, further comprising providing a user interface directly accessible by the consumer via a global computer network and configured to be used by the consumer for one of: checking status of pending rebate claims, checking account history, submitting rebate claims, authorizing rebate processing, or a combination thereof.

21. The method of claim 1, comprising receiving the rebate claim from a computer system used for processing the purchase transaction without further action from the consumer following the purchase transaction.

22. The method of claim 21, comprising processing the rebate claim and crediting the designated account without further action from the consumer following the purchase transaction.

23. A computer system for processing a rebate claim from a purchaser corresponding to at least one purchase transaction, wherein the rebate claim is triggered by involvement in the purchase transaction of a designated account associated with the purchaser and having an account identifier, the system comprising:
- means for receiving, in the computer system, purchaser information comprising personal information about the purchaser, including the account identifier corresponding to the designated account, wherein the designated account comprises a credit card account, a debit card account, or a bank account, storing the purchaser information as a stored data record accessible by the computer system;
- means for receiving and storing in the computer system promotion information comprising one or more promotional offers associated with one or more promoted products, each promoted product having a product identifier, each promotional offer having a value;
- means for receiving and storing in the computer processing system purchase information corresponding to the at least one purchase transaction, the purchase information comprising: at least the purchaser's designated account identifier as an indication of use of the account as an instrument of payment for the purchase transaction, and at least each product identifier corresponding to each promoted product purchased in the at least one purchase transaction;
- a processor programmed with instructions for carrying out method steps for:
  - (a) associating the purchase information with the purchaser by matching the purchaser's designated account identifier in the purchase information with the designated account identifier in the stored data record;
  - (b) validating the rebate claim by matching the product identifier corresponding to each promoted product in the stored purchase information to the promotional offer associated with that product identifier in the stored promotion information, and
  - (c) providing a collective value associated with the rebate claim to the purchaser in the form of a credit.

24. The system of claim 23, wherein the designated account has a designated card associated therewith.

25. The system of claim 23, wherein the computer system is configured to receive purchase information from at least a first establishment and a second establishment.

26. The system of claim 25, wherein the first establishment and the second establishment are unrelated to one another.

27. The system of claim 26, wherein the first establishment and the second establishment are participating members of a common network for processing rebates associated with purchases using the designated account.

28. The system of claim 27, wherein the designated card is a credit card or a debit card that is legal tender for making purchases from establishments outside of the common network.

29. The system of claim 28, wherein the credit issued to the consumer for the rebate claim is a credit usable for making purchases from establishments outside of the common network.

30. The system of claim 29, wherein the credit provided to the purchaser comprises a credit to the designated account.

31. The system of claim 23, wherein the processor is configured to receive and process the rebate claim automatically after the purchase transaction without further action from the consumer.

32. The system of claim 23, further comprising a user interface directly accessible by the consumer via a global computer network and configured to be used by the consumer for one of: checking status of pending rebate claims, checking account history, submitting rebate claims, authorizing rebate processing, or a combination thereof.

33. The system of claim 32, wherein the one or more promotional offers has a qualifying time period associated therewith during which purchase transactions must be made, and the system is configured to receive an instruction from the purchaser via the online user interface prior to the end of the qualifying period effective to initiate rebate claim processing.

34. The system of claim 23, wherein the computer system is further configured to compile marketing information about the consumer based upon the purchase information associated with the consumer, the marketing information comprising information regarding at least one product of expected interest to the consumer based upon a prior consumer purchase.

35. The system of claim 34, further comprising means for targeting the consumer with a marketing offer based upon the marketing information compiled about the consumer.

36. A method of using a computer processing system to process a rebate claim from a purchaser corresponding to at least one purchase transaction, wherein the rebate claim is triggered by involvement during the purchase transaction of a designated account associated with the purchaser and having an account identifier, the method comprising the steps of:
- (a) receiving, in the computer processing system, purchaser information comprising personal information about the purchaser, including the account identifier corresponding to the designated account, and storing the purchaser information as a stored data record accessible by the computer processing system;
- (b) receiving and storing in the computer processing system promotion information comprising one or more promotional offers associated with one or more promoted products, each promoted product having a product identifier, each promotional offer having a value, the one or more promotional offers having a qualifying time period associated therewith during which purchase transactions must be made;
- (c) receiving and storing in the computer processing system purchase information corresponding to the at least one purchase transaction, the purchase information comprising at least the purchaser's designated account identifier and at least each product identifier corresponding to each promoted product purchased in the at least one purchase transaction;
- (d) using the computer processing system to associate the purchase information with the purchaser by matching the purchaser's designated account identifier in the purchase information with the designated account identifier in the stored data record;
- (e) using the computer processing system to validate the rebate claim by purchase information to the promotional offer associated with that product identifier in matching the product identifier corresponding to each promoted product in the stored the stored promotion information,
- (f) providing an online user interface directly accessible by the purchaser;

(g) receiving an instruction from the purchaser via the online user interface prior to the end of the qualifying period authorizing completion of rebate claim processing;

(h) providing a collective value associated with the rebate claim to the purchaser.

37. The method of claim 36, wherein the step of providing the collective value to the purchaser comprises providing a credit, a check, an article of manufacture, or a coupon good for a future purchase.

38. The method of claim 36, wherein the designated account comprises a credit card account, a debit card account, or a bank account and the involvement of the account during the purchase transaction comprises use of the designated account as an instrument of payment for the purchase transaction.

39. The method of claim 38, wherein the step of providing the collective value to the purchaser comprises providing a credit to the designated account.

\* \* \* \* \*